(12) United States Patent
Chou et al.

(10) Patent No.: US 8,352,058 B2
(45) Date of Patent: Jan. 8, 2013

(54) OFFICE AUTOMATION DEVICE FOR PRELOADING CONTENT ON MEMORY CARDS AND PROCESSING METHOD THEREOF

(75) Inventors: Chi-Yang Chou, Kao-hsiung (TW); Pei-Yen Chou, Hsin-chu (TW); Yeu-Chung Lin, Chang-hua (TW)

(73) Assignee: Condel International Technologies Inc., George Town (KY)

( * ) Notice: Subject to any disclaimer, the term of this patent is extended or adjusted under 35 U.S.C. 154(b) by 1004 days.

(21) Appl. No.: 12/368,324

(22) Filed: Feb. 10, 2009

(65) Prior Publication Data

US 2010/0042245 A1 Feb. 18, 2010

Related U.S. Application Data

(63) Continuation-in-part of application No. 12/192,542, filed on Aug. 15, 2008, now abandoned.

(51) Int. Cl.
*G06F 19/00* (2011.01)

(52) U.S. Cl. ............... 700/110; 324/750.14; 365/189.05

(58) Field of Classification Search .................. 700/110; 324/750.14; 365/189.05
See application file for complete search history.

(56) References Cited

U.S. PATENT DOCUMENTS

2006/0066293 A1* 3/2006 Gopal et al. ............... 324/158.1

* cited by examiner

*Primary Examiner* — Tejal Gami
(74) *Attorney, Agent, or Firm* — Thomas|Kayden

(57) ABSTRACT

An OA device for preloading content on memory cards is disclosed. A handler control module of a control unit performs a preloading process which comprises a preload check, preloading content based on digital content stored in buffers, and a preloaded content comparison, wherein memory cards at the initial column of a tray are checked, preloaded, and compared with the preloaded digital content using probes of a probe module. When the preloading content for the memory cards at the initial column of the tray is complete, the tray module or the probe module is moved by a stepper module by a predetermined distance, or the moving arm moves the probe module with a predetermined distance, to enable the memory cards at the next column of the tray to be checked, preloaded, and compared with the preloaded digital content using the probes while a sorting module picks up failed memory cards from the previous column based on records and instructions from the handler control module of the control unit.

28 Claims, 4 Drawing Sheets

OFFICE AUTOMATION DEVICE FOR PRELOADING CONTENT ON MEMORY CARDS AND PROCESSING METHOD THEREOF

CROSS REFERENCE TO RELATED APPLICATIONS

This Application claims priority of U.S. patent application Ser. No. 12/192,542, filed on Aug. 15, 2008, now abandoned, the entirety of which is incorporated by reference herein.

BACKGROUND OF THE INVENTION

1. Field of the Invention

The invention relates to an office automation (OA) device, and more particularly to an OA device for preloading content on memory cards and a processing method thereof.

2. Description of the Related Art

Preloading content on memory cards can be implemented using the following methods.

First, during memory card manufacturing, a format tool is used for low level formatting and testing of memory cards. Meanwhile, the format tool and a handler are used for preloading content onto memory cards. However, this method for preloading content onto memory cards has deficiencies. First, costs are high due to the costs of the format tool and handler. Next, manufacturing output is inconsistent as time required for preloading content is reliant upon content amount. Additionally, the number of format tools and handlers required differ with the time required for low level formatting and testing, and required manufacturing line flow. Lastly, the manufacturing process is non-flexible as any change in preloaded content results in manufacturing shut down due to the requirement to re-qualify the manufacturing lines before re-starting the manufacturing process with the adjusted preloaded content.

Second, preloading content can be implemented using a specialized content preloader that preloads content on memory cards following completion of memory card manufacturing, low level formatting, testing, and industrial packaging. The preloader usually comprises a control unit, such as a computer or a motherboard, to store content and perform an application for preloading content. The control unit is coupled to card readers with multi-ports via an interface and empty memory cards to be preloaded are manually inserted into the card readers or probe bakelite slots extended from the card readers to preload content. When the preloading is complete, the preloaded memory cards are manually removed. While this method for preloading content costs relatively less, much labor is required. Additionally, inefficiency increases as the size of the preloaded content decreases. Specifically, despite requirement for preloaded content for a small lot size, manual labor for insertion, removal or changing of memory cards would be the same as that required for preloaded content of a larger lot size. Furthermore, tracking and management of memory cards are inconvenient and may lead to human error, as each memory card must be manually taken out of and put back into standard trays.

Thus, an OA device for preloading content on memory cards and processing method thereof is desirable.

BRIEF SUMMARY OF THE INVENTION

Processing methods for an OA device for preloading content on memory cards are provided. An exemplary embodiment of a processing method for an OA device for preloading content on memory cards comprises the following. First, a control unit and a handler unit of the OA device are configured, wherein the handler unit comprises a first interface module, a probe module, a stepper module, a JEDEC tray module, and a sorting module and the control unit comprises a digital content management module, a handler control module, and a second interface module. The control unit connects to the handler unit via the first and second interface modules. Next, the handler unit and the control unit are powered on and initialized. A tray, carrying memory cards to be preloaded, is loaded in the tray module and a preloading content process is started using the control unit. When the preloading content process is performed, the tray is moved to an initial position using the stepper module. Probes provided by the probe module are enabled to electronically touch memory cards at the initial column of the tray. A ready signal is sent to the handler control module of the control unit via the first and second interface modules. When a ready signal is received, a preloading content program is performed using the digital content management module to enable the probe module to preload digital content stored in memory buffers of the digital content management module onto the memory cards of the initial column of the tray. When preloading content for the memory cards of the initial column is completed, the tray module is moved by the stepper module by a predetermined distance to enable memory cards of the next column of the tray to be preloaded.

OA devices for preloading content on memory cards are provided. An exemplary embodiment of an OA device for preloading content on memory cards comprises a handler unit and a control unit. The handler unit further comprises a first interface module, a probe module providing plural probes, a stepper module, a tray module, and a sorting module. The control unit further comprises a digital content management module providing memory buffers that store digital content parameters related to the digital content, a handler control module, and a second interface module, wherein the control unit is connected to the handler unit via the first interface. A tray carrying memory cards to be preloaded is loaded in the tray module. The handler control module of the control unit performs a preloading process comprising a preload check, preloading content based on the digital content stored in the buffers, and a preloaded content comparison, wherein the memory cards at the initial column of the tray are checked, preloaded, and compared with the preloaded digital content using the probes of the probe module. When the preloading process for the memory cards at the initial column of the tray is complete, the tray module is then moved by the stepper module by a predetermined distance, or the moving arm moves the probe module with a predetermined distance, to enable the memory cards at the next column of the tray to be checked, preloaded, and compared with the preloaded digital content using the probes of the probe module, while the sorting module is picking up, marking or recording and then makes a tray map of failed memory cards from the previous column based on records and instructions from the handler control module of the control units.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
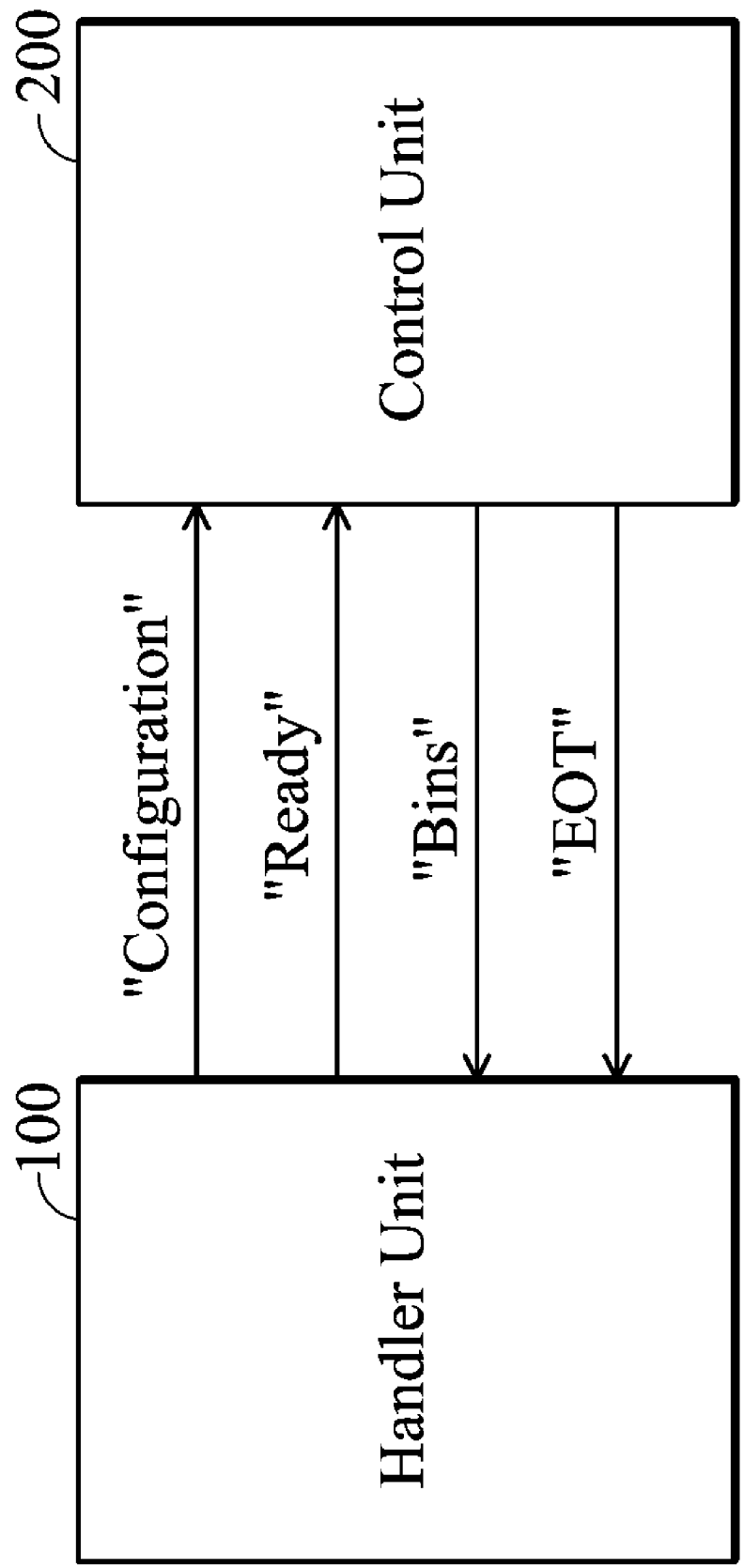
FIG. 1 is a schematic view of communication between a control unit and a handler unit for preloading content of the present invention.

Several exemplary embodiments of the invention are described with reference to FIGS. 1 through 3B, which generally relate to an OA device for preloading content on memory cards. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses an OA device for preloading content on memory cards and processing method thereof.

An embodiment of the OA device enables users to preload content on memory cards (flash cards, for example) by an automated process using the OA device. The functions and properties of the OA device are similar to an inkjet printer that provides flexibility to efficiently copy a variety of sizes of content to specific storage media, such as memory cards.

FIG. 1 is a schematic view of communication between a control unit and a handler unit for preloading content of the present invention.

The OA device at least comprises a handler unit 100 and a control unit 200. The control unit 200 receives instructions, configurations, and a "Ready" signal from the handler unit 100 to prepare original digital content, to be preloaded on each of the memory cards placed at designated positions. The control unit 200 transmits the original digital content to the handler unit 100 and starts a preloading content process in parallel for each of the memory cards designated for content preloading using the handler unit 100. When the preloading content process is completed, the control unit 200 implements a content test process using the handler unit 100 that compares the preloaded content on each of the memory cards with the original content and the handler unit 100 receives "Bins" from the control unit 200. The "Bins" represent the status of the content comparisons and the length thereof is, for example, 8 bits in which each of the bits is used to record the content test results of each of the memory cards. A content comparison passes, if a bit is filled with "H", and fails, if filled with "L". Additionally, when the content test process for each of the memory cards is complete, the control unit 200 sends an EOT (represent End Of Test) signal to the handler unit 100.

Figure 2:
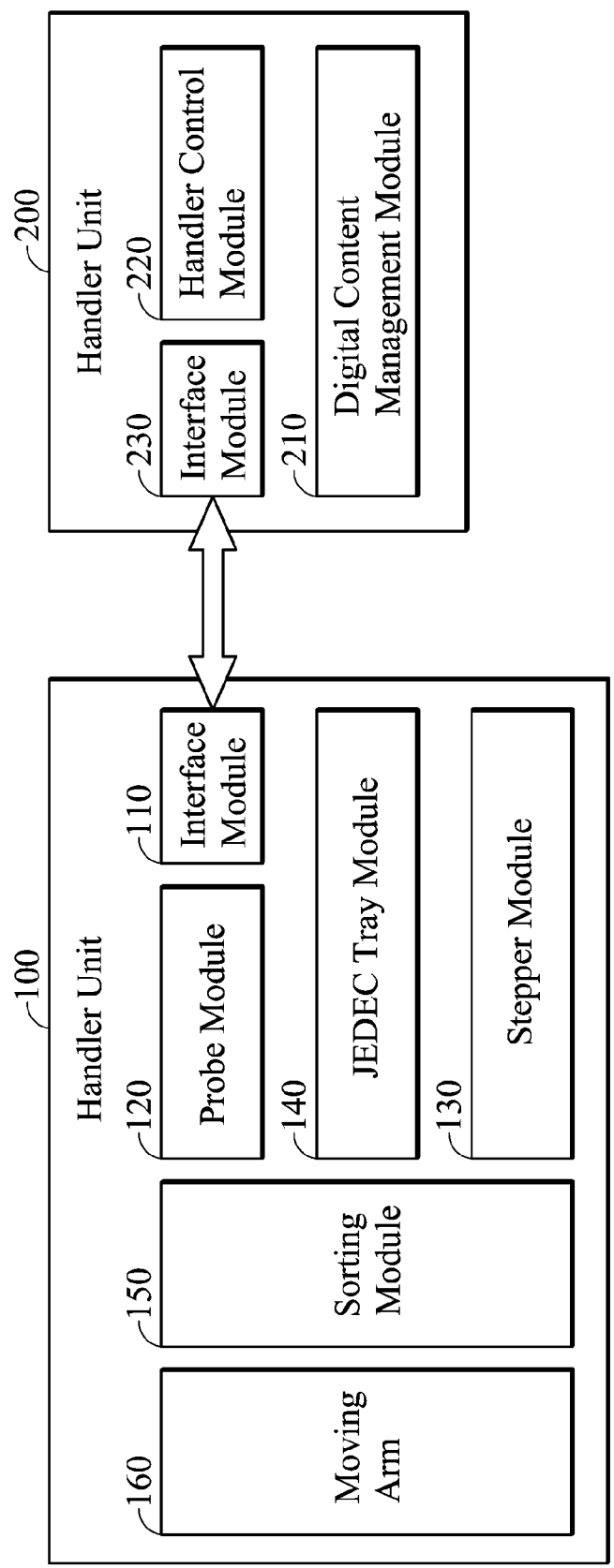
FIG. 2 is a detailed schematic view of an OA device of the present invention.

FIG. 2 is a detailed schematic view of an OA device of the present invention.

The handler unit 100 of the OA device comprises an interface module 110, a probe module 120, a stepper module 130, a Joint Electronic Device Engineering Council (JEDEC) tray module 140, a sorting module 150 and a moving arm 160. The control unit 200 of the OA device comprises a digital content management module 210, a handler control module 220, and an interface module 230.

The handler unit 100 receives instructions from the control unit 200 and preloads digital content on memory cards.

The interface module 110 receives operation instructions and digital content from the control unit 200, enables the handler unit 100 to perform mechanical and electrical operations according to the instructions, and returns operating results to the control unit 200. The handler unit 100 communicates, using the interface module 110, with the control unit 200, using the interface module 230, via a network (such as the Local Area Network (LAN)) or an industrial standard interface, such as an RS-232.

The probe module 120 enables probes to electronically touch gold fingers of memory cards carried by a JEDEC tray. Thus, the memory cards can be directly preloaded on the tray instead of being removed and inserted into card slots. Thus, scratches on the gold fingers of memory cards caused by the removal and insertion actions are avoided by applying probes on the cards on the JEDEC tray. Increasing the number of probes utilized to perform the preloading process may increase production efficiency. However, the number of memory cards to be simultaneously preloaded is limited due to the limited data transmission bandwidth of the control unit 200. Additionally, the number of memory cards to be located at each row must be considered when facilitating mechanical control. With respect to the current state of the art, the optimal number of parallel probes to probe gold fingers of memory cards has been found to be 8. The number, 8, can be adjusted based on data transmission efficiency and variation of the standard tray design for the current state of the art. In this embodiment, probes in the horizontal direction are not moved but only sequentially electronically touch and are disconnected from the memory cards of the JEDEC tray by top-down motions in the vertical direction. In another embodiment, the JPEG tray is fixed and the probe module 120 enables the probes to sequentially electronically touch and be disconnected from the memory cards of the JEDEC tray by horizontal and vertical motions. It is noted that, due to frequent use of the probes, the probes may be replaced by new probes based on frequency of usage. The frequency of usage records of the probes are recorded by the control unit 200, and an alarm is issued when use frequency of usage approaches an upper limit of a security value.

The stepper module 130 moves the probe module 120 or the JEDEC tray module 140 by a predetermined distance (one column, for example) to preload the next column of the memory cards. As described, since 8 parallel probes are provided for each column, 8 parallel memory cards are also provided for each column on the JEDEC tray module 140. When the memory card testing, preloading content, and testing of the preloaded content for the 8 parallel memory cards of an initial column is completed using the 8 parallel probes, the stepper module 130 moves the probe module 120 or the JEDEC tray module 140 by a predetermined distance, to enable card testing, preloading content, and testing of the preloaded content to be implemented on the 8 parallel memory cards of the next column, and so forth. In another embodiment, the stepper module 130 can also move the probes to electronically touch the memory cards located at each column while the JEDEC tray module 140 is fixed. Operating time for the start and termination of the stepper module 130 and the start and termination of a vacuum sucker and arm module (not shown, described in the following) which moves the memory cards should be considered when coordinating mechanical and electrical operations of the handler unit 100. A preloading test is performed to determine whether the memory cards are applicable. A test failure result may be generated due to a failed electronic connection (reversed or no memory cards located), bad connections (probe abrasion, golden finger abrasion, inclined memory cards, broken circuits inside the memory cards, and so forth), unrecognized memory cards (un-formatted memory cards or broken circuits inside of the memory cards), insufficient storage space (mistaken located memory capacity or mass data which has been stored in the memory cards), and so forth. The described situations are reported to the control unit 200 via the interface module 110 and the control unit 200 determines follow-up procedures based on logical conditions, such as an interruption of the overall preloading process (for example, the memory cards on the JEDEC tray module 140 are all reversed), troubleshooting, or picking up abnormal cards by the vacuum sucker and arm module (not shown), or marking abnormal cards, when a preloading cycle is complete, or just presenting a failed part position and the reason for failure and recording it in the tray map. The preloading content process preloads the same or different digital content on memory cards, such as preloading serial numbers of the memory cards, which does not affect performance of the stepper module 130 because the digital content has been prepared and stored in memory buffers (not shown) of the digital content management module 210 so that preloading the same or different digital content can be simultaneously implemented. When preloading content is completed, the digital content preloaded on the memory cards are read and compared with that stored in the memory buffers by bit-to-bit comparison. If the preloaded content has errors, the errors are transmitted to the digital content management module 210 of the control unit 200 to be recorded and failed memory cards are picked up using the vacuum sucker and arm module (not shown), marked, or recorded by creating a corresponding tray map.

The JEDEC tray module 140, like a paper drawer of a printer, provides a JEDEC tray carrying memory cards so that the memory cards are sequentially fixed in predetermined positions for preloading content. The JEDEC tray, a standard tray, is applied in this embodiment since all the memory cards are located therein while being packaged, low level formatted, and tested. Thus, utilizing the JEDEC tray can prevent problems associated with changing tray components and will not increase costs for requiring other types of trays. Additionally, the memory cards, when preloaded, can be stored in the JEDEC tray and directly transported to the next stage, such as a packaging factory, a retail unit or an end client. Each JEDEC tray carries a predetermined number of memory cards, such as 8×15 for micro SD cards. It should be noted that the gold fingers of the memory cards face upward and probes electronically touch the gold fingers from the top to the bottom in this embodiment. However, in another embodiment, the gold fingers of the memory cards can face downward and the probes can electronically touch the gold fingers from the bottom to the top.

The sorting module 150 picks up failed memory cards located in the JEDEC tray module 140 and places the failed memory cards in a recycling container for re-verification. The sorting module 150 further comprises a vacuum generator (not shown), an adjustable arm (not shown), a pressure sensor (not shown), and a sucker (not shown). The vacuum generator enables the sucker to absorb memory cards. The pressure sensor detects pressure variations of the sucker to determine whether the sucker has successfully sucked the memory cards and, if so, places the memory card in the recycling container. When a preloading loop for memory cards of a column is completed using the probe module 120, the digital content management module 210 reports physical positions of the memory cards with failed content testing to the control unit 200 and the stepper module 130 moves the JEDEC tray module 140 by the predetermined distance to preload memory cards of the next column while the sorting module 150 picks up failed memory cards placed at the previous column, thus saving time. Specifically, the sorting module 150 operates right after the probe module 120, so that moving of the JEDEC tray module 140 and picking up of the failed memory cards are simultaneously performed, thus enhancing manufacturing efficiency. Since failed memory cards have already been picked up, positions are not recorded in the control unit 200 or the failed memory cards are not required to be manually picked up based on mapping of the test results.

As described, the stepper module 130 moves the tray module 140 by a predetermined distance. In another embodiment as described, when the tray is fixed, the tray or the tray module 140 should not be moved using the stepper 130, such that the handler unit 100 may not comprise the stepper module 130. Thus, the probe module 120 can be moved using the moving arm 160 (as shown in FIG. 2) to enable the probes above the tray module 140 to sequentially electronically touch and be disconnected from the memory cards of the JEDEC tray by horizontal and vertical motions.

The digital content management module 210 can process, edit, and store digital content and provide source digital content to be preloaded on memory cards. The source digital content to be preloaded is stored in a corresponding memory buffer.

The handler control module 220 controls operations of the handler unit 100 and records operation results, such as the start and end of preloading operations and operation modes of the preloading operations. For example, a batch operation can provide individual preloading or mass preloading, the number of memory cards to be preloaded, records of test results of the memory cards, exhausted alarms for the memory cards, alarms for errors during the preloading process or unexpected interrupts, troubleshooting, and so forth.

The interface module 230 transmits instructions and test results to and receives operation statuses from the handler unit 100.

The control unit 200 can also be implemented by software to be installed in a personal computer for cost down and be controlled as a printer. Additionally, a motherboard implementing the control unit 200 can be installed on the handler unit 100 and can be controlled using software and firmware.

A preloading content process using the components shown in FIG. 2 is described as follows.

When a JEDEC tray carrying memory cards to be preloaded is conveyed and inserted in the JEDEC tray module 140, the digital content management module 210 sets the digital content and relating parameters (such as the number of memory cards to be preloaded for each column of the JEDEC tray), and the handler control module 220 starts to perform a preload check, content preloading, and a preloaded content comparison using the probe module 120. The memory cards at the initial column of the JEDEC tray are checked, preloaded, and compared with the preloaded digital content and the JEDEC tray module 140 is moved by the stepper module 130 to enable the memory cards at the second column of the JEDEC tray to be checked, preloaded, and compared with the preloaded digital content while the sorting module 150 picks up failed memory cards from the previous column based on records and instructions from the control units 200 or the failed memory cards are marked or recorded by creating a corresponding tray map.

The digital preloading content is complete when the number of preloaded memory cards reaches a predetermined number and the last JEDEC tray is removed, if required, from the JEDEC tray module 140. If the number of memory cards carried by the JEDEC tray does not reach the predetermined number, another JEDEC tray carrying memory cards to be preloaded is further conveyed and inserted in the JEDEC tray module 140 to perform another preloading content process.

Figure 3A:
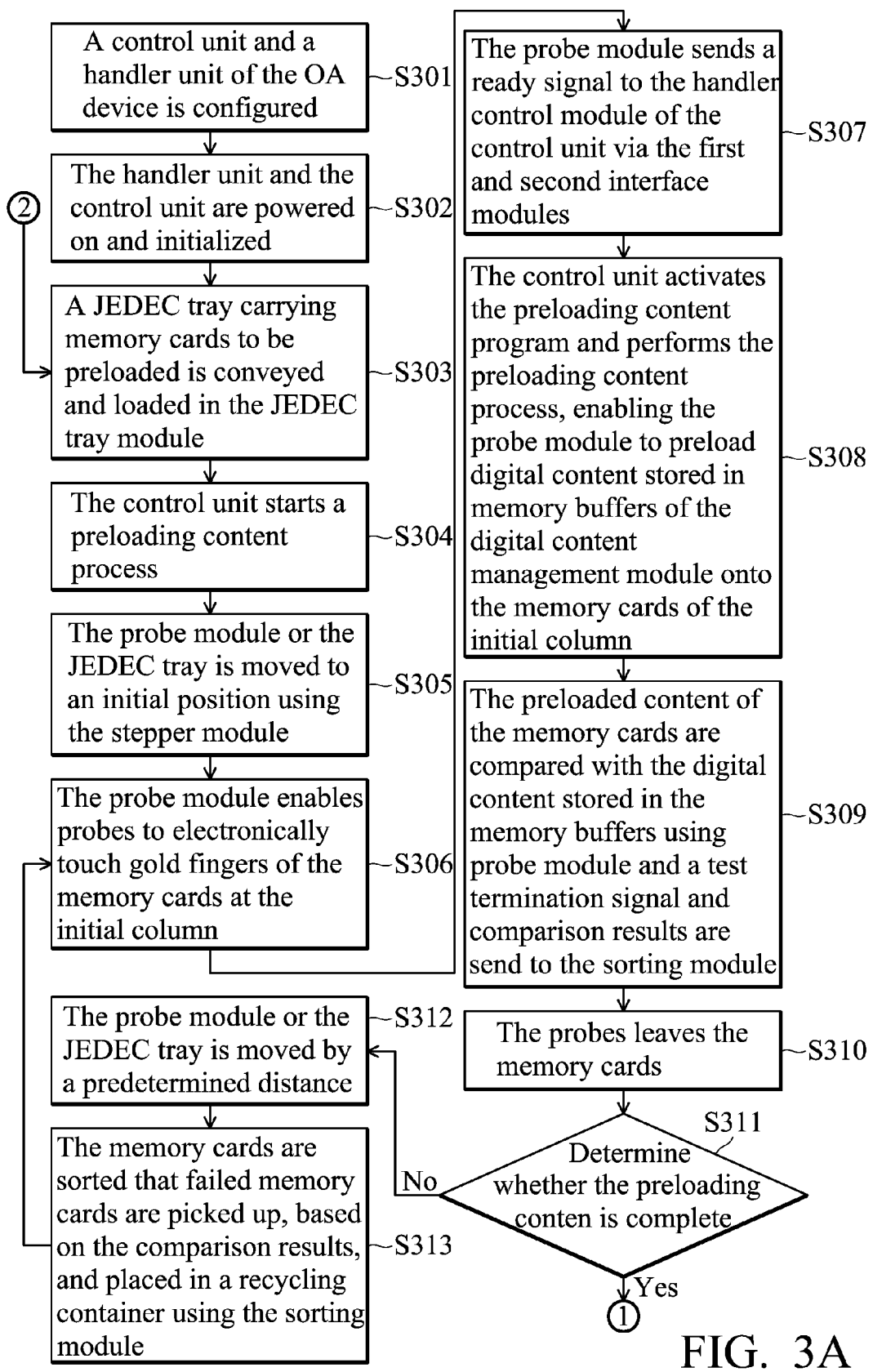
FIGS. 3A and 3B are flowcharts of a processing method for an OA device for preloading content on memory cards of the present invention.
Figure 3B:
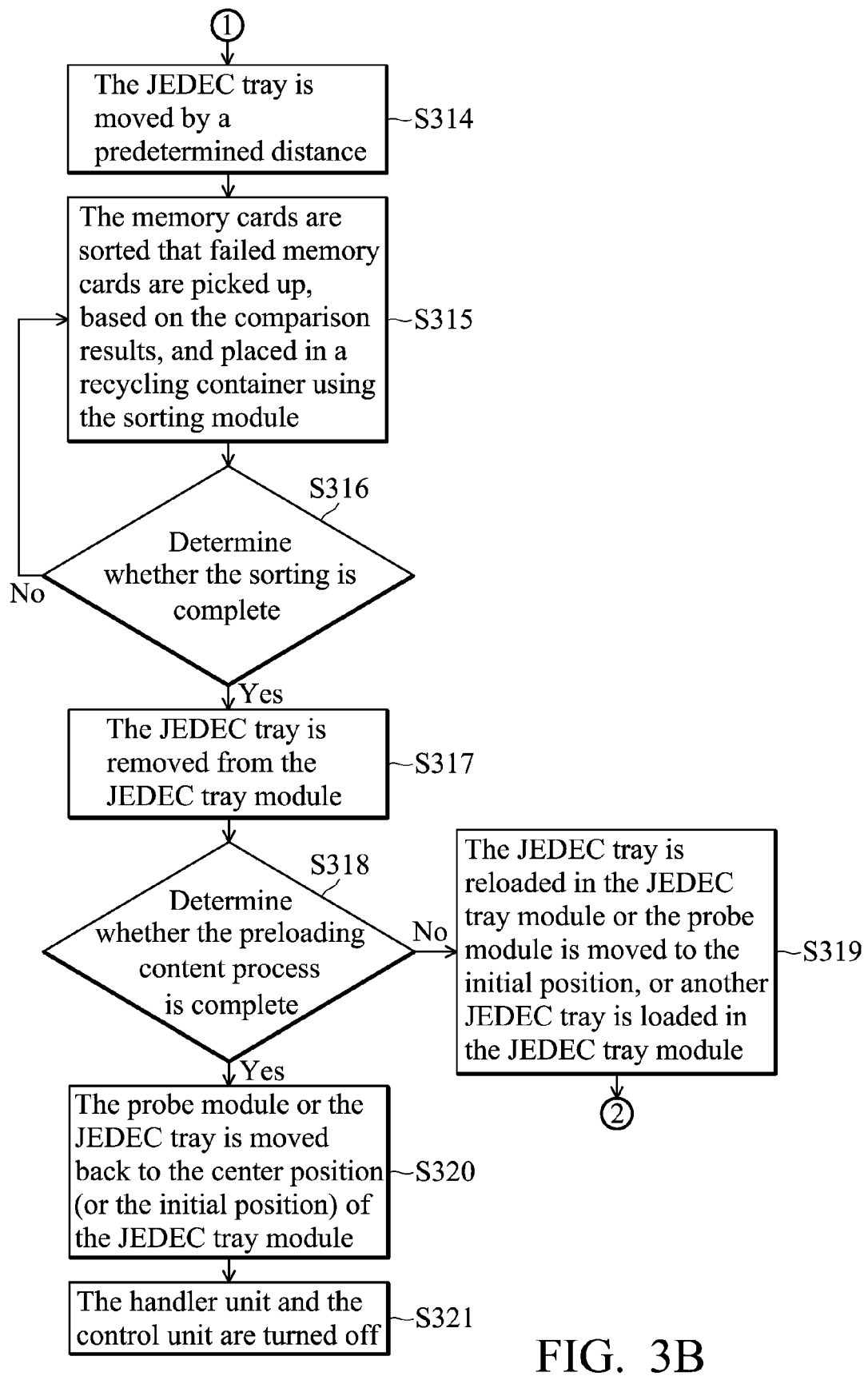

FIGS. 3A and 3B are flowcharts of a processing method for an OA device for preloading content on memory cards of the present invention.

First, a control unit and a handler unit of the OA device is configured (step S301). The handler unit comprises a first interface module, a probe module, a stepper module, a JEDEC tray module, and a sorting module. The control unit comprises a digital content management module, a handler control module, and a second interface module. The configuration provides an interface (cable) connection between the control unit and the handler unit, actuation of the control unit, and execution of a preloading content program of the control unit.

Next, the handler unit and the control unit are powered on and initialized (step S302). A JEDEC tray carrying memory cards to be preloaded is conveyed and loaded in the JEDEC tray module (step S303), and the control unit starts a preloading content process (step S304). When the preloading content process is performed, the JEDEC tray is moved to an initial position using the stepper module (step S305), the probe module enables probes to electronically touch gold fingers of the memory cards at the initial column (step S306) and sends a ready signal to the handler control module of the control unit via the first and second interface modules (step S307).

When the ready signal is received, the control unit activates the preloading content program and performs the preloading content process, enabling the probe module to preload digital content stored in memory buffers of the digital content management module onto the memory cards of the initial column (step S308). When preloading content for the memory cards at the initial column is completed, the preloaded content of the memory cards are compared with the digital content stored in the memory buffers using a probe module and a test termination signal ("EOT") and comparison results ("Bins") are send to the sorting module (step S309). Next, the probes leave the memory cards (step S310) and the handler control module of the control unit determines whether the preloading content process is complete (step S311).

If the preloading content process is incomplete, the probe module or the JEDEC tray is moved by a predetermined distance (one column, for example) (step S312) and the memory cards are sorted so that failed memory cards are picked up, based on the comparison results, and placed in a recycling container using the sorting module (or the failed memory cards are marked or recorded by creating a corresponding tray map) (step S313) while the preloading content process using the probe module is being performed on the memory cards at the next column (step S312). If the preloading content process is completed, the JEDEC tray is moved by a predetermined distance (one column, for example) (step S314) and the memory cards are sorted so that failed memory cards at the last column are picked up, based on the comparison results, and placed in the recycling container using the sorting module (or the failed memory cards are marked or recorded by creating a corresponding tray map) (step S315).

The handler control module of the control unit determines whether the sorting is complete (step S316). If the sorting is completed, the JEDEC tray is removed from the JEDEC tray module (step S317) and the handler control module of the control unit determines whether the preloading content process is complete (step S318). If the preloading content process is incomplete, the JEDEC tray is reloaded in the JEDEC tray module or the probe module is moved to the initial position, or another JEDEC tray is loaded in the JEDEC tray module (step S319) for another preloading content process. If the preloading content process is complete, the probe module or the JEDEC tray is moved back to the center position (or the initial position) of the JEDEC tray module (step S320) and the handler unit and the control unit are turned off (step S321).

An embodiment of an OA device for preloading content on memory cards can reduce labor and prevent human error from manual operations. The OA device can perform digital preloading of content at a location such as an office. The content owner does not require outsourcing, thus hindering pirating of digital content. Additionally, the production cycle is substantially reduced. The control unit of the OA device can also be implemented by software installed in a personal computer for cost down and controlled as an office inkjet printer with the Local Area Network (LAN). The OA device is applicable for mass production and small-scale production, thus, very flexible. The preloading content process is separate from the standard memory card manufacturing process and does not decrease production efficiency based on capacity of the digital content to be preloaded. Additionally, the OA device utilizes a standard JEDEC tray so that memory cards to be preloaded are placed in the JEDEC tray from the beginning to the end, reducing production costs, and preventing complication from loading and unloading the JEDEC tray and packaging, and completely integrating production flow for memory card manufacturing and the packaging and retail of the preloaded memory cards.

Methods and systems of the present disclosure, or certain aspects or portions of embodiments thereof, may take the form of a program code (i.e., instructions) embodied in flash cards, such as SD card, micro SD card, mini SD card, MMC card, memory stick card, xD card, etc., wherein, when program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An office automation device for preloading content on memory cards, comprising:
   a handler unit, further comprising:
   a first interface module;
   a probe module providing plural probes;
   a moving arm;
   a stepper module;
   a tray module; and
   a sorting module; and
   a control unit, further comprising:

a digital content management module providing memory buffers that store digital content and parameters related to the digital content;

a handler control module; and a second interface module, connecting the control unit to the handler unit via the first interface, wherein a tray carrying memory cards to be preloaded is loaded in the tray module, the handler control module of the control unit starts to perform a preloading content process comprising a preload check, preloading content based on the digital content stored in the buffers, and a preloaded content comparison, wherein the memory cards at the initial column of the tray are checked, preloaded, and compared with the preloaded digital content using the probes of the probe module, and when the preloading content for the memory cards at the initial column of the tray is completed, the tray module is then moved by the stepper module by a predetermined distance to enable the memory cards at the next column of the tray to be checked, preloaded, and compared with the preloaded digital content using the probes of the probe module while the sorting module is picking up or marks or records failed memory cards from the previous column based on records and instructions from the handler control module of the control units.

2. The office automation device for preloading content on memory cards as claimed in claim 1, wherein the preloading content process is finished when the number of preloaded memory cards reaches a predetermined number and the last tray is removed from the tray module.

3. The office automation device for preloading content on memory cards as claimed in claim 2, wherein another tray carrying memory cards to be preloaded is further loaded in the tray module for performing another preloading content process when the number of preloaded memory cards does not reach the predetermined number.

4. The office automation device for preloading content on memory cards as claimed in claim 1, wherein the first interface module receives operation instructions and digital content from the control unit, enables the handler unit to perform mechanical and electrical operations according to the instructions, and returns operating results to the control unit.

5. The office automation device for preloading content on memory cards as claimed in claim 4, wherein the handler unit communicates, using the first interface module, with the control unit, using the second interface module, via a network or an industrial standard interface.

6. The office automation device for preloading content on memory cards as claimed in claim 1, wherein the probe module enables the probes to electronically touch gold fingers of the memory cards carried by the tray.

7. The office automation device for preloading content on memory cards as claimed in claim 6, wherein the probes electronically touches and leaves the memory cards by horizontal motions, vertical motions, or combinations thereof.

8. The office automation device for preloading content on memory cards as claimed in claim 7, wherein an alarm is issued when use frequency of the probes approaches an upper limit of a security value.

9. The office automation device for preloading content on memory cards as claimed in claim 1, wherein a predetermined number of parallel probes and memory cards are provided for each column of the tray.

10. The office automation device for preloading content on memory cards as claimed in claim 1, wherein the moving arm further moves the probes to touch the memory cards of each column while the tray module is fixed.

11. The office automation device for preloading content on memory cards as claimed in claim 1, wherein the tray is a JEDEC tray.

12. The office automation device for preloading content on memory cards as claimed in claim 1, wherein the sorting module further comprises a vacuum generator, an adjustable arm, a pressure sensor, and a sucker.

13. The office automation device for preloading content on memory cards as claimed in claim 12, wherein the pressure sensor detects pressure variations of the sucker to determine whether the sucker has successfully sucked the failed memory cards.

14. The office automation device for preloading content on memory cards as claimed in claim 13, wherein when a preloading loop for memory cards of a column is completed using the probe module, the digital content management module reports the physical positions of memory cards with failed content comparisons to the control unit.

15. The office automation device for preloading content on memory cards as claimed in claim 14, wherein the stepper module moves the tray module or the moving arm moves the probe module by the predetermined distance for preloading memory cards of the next column while the sorting module is picking up failed memory cards of the previous column.

16. A processing method for an office automation device for preloading content on memory cards, comprising:

configuring a control unit and a handler unit of the OA device, wherein the handler unit comprises a first interface module, a probe module, a moving arm, a stepper module, a JEDEC tray module, and a sorting module and the control unit comprises a digital content management module, a handler control module, and a second interface module;

connecting the control unit and the handler unit via the first and second interface modules;

powering on and initializing the handler unit and the control unit;

loading a tray carrying memory cards to be preloaded in the tray module and starting a preloading content process using the control unit;

when the preloading content process is performed, moving the tray to an initial position using the stepper module or moving the probe module to the initial position using the moving arm;

enabling probes provided by the probe module to electronically touch memory cards at the initial column of the tray;

sending a ready signal to the handler control module of the control unit via the first and second interface modules;

when a ready signal is received, performing preloading content using the digital content management module to enable the probe module to preload digital content stored in memory buffers of the digital content management module onto the memory cards of the initial column of the tray; and when the preloading content for the memory cards of the initial column is completed, moving the tray by the stepper module by a predetermined distance or moving the probe module using the moving arm by the predetermined distance to enable memory cards of the next column of the tray to be preloaded.

17. The processing method for an office automation device for preloading content on memory cards as claimed in claim 16, further comprising:

when the preloading content for the memory cards of the initial column is completed, comparing the preloaded content of the memory cards with the digital content stored in the memory buffers using a probe module;

sending a test termination signal and comparison result to the sorting module;

enabling the probes from the memory cards and determining whether the handler control module of the control unit has completed the preloading content process;

if the preloading content process is incomplete, moving the probe module or the tray by the predetermined distance; and sorting the memory cards using the sorting module, wherein failed memory cards are determined based on the comparison results, while the preloading content process using the probe module is being performed on the memory cards at the next column.

18. The processing method for an office automation device for preloading content on memory cards as claimed in claim 17, further comprising:

if the preloading content is complete, moving the probe module or the tray by a predetermined distance; and sorting the memory cards using the sorting module, wherein failed memory cards are determined based on the comparison results.

19. The processing method for an office automation device for preloading content on memory cards as claimed in claim 16, further comprising:

determining whether the handler control module has completed the sorting; and if the sorting is complete, removing the tray from the tray module.

20. The processing method for an office automation device for preloading content on memory cards as claimed in claim 16, further comprising:

determining whether the handler control module has completed the preloading content process; and if the preloading content process is incomplete, reloading the tray in the tray module or moving the probe module to the initial position, or loading another tray in the tray for another preloading content process.

21. The processing method for an office automation device for preloading content on memory cards as claimed in claim 20, further comprising moving the probe module or the tray back to the center position or the initial position of the tray module and turning off the handler unit and the control unit if the preloading content process is incomplete.

22. A non-transitory computer-readable medium encoded with computer executable instructions for performing a processing method for an office automation device for preloading content on memory cards, comprising:

configuring a control unit and a handler unit of the OA device, wherein the handler unit comprises a first interface module, a probe module, a moving arm, a stepper module, a JEDEC tray module, and a sorting module and the control unit comprises a digital content management module, a handler control module, and a second interface module;

connecting the control unit and the handler unit via the first and second interface modules; powering on and initializing the handler unit and the control unit;

loading a tray carrying memory cards to be preloaded in the tray module and starting a preloading content process using the control unit;

when the preloading content process is performed, moving the tray to an initial position using the stepper module or moving the probe module to the initial position using the moving arm;

enabling probes provided by the probe module to electronically touch memory cards at the initial column of the tray;

sending a ready signal to the handler control module of the control unit via the first and second interface modules;

when the ready signal is received, performing a preloading content program using the digital content management module to enable the probe module to preload digital content stored in memory buffers of the digital content management module onto the memory cards of the initial column of the tray; and when the preloading content for the memory cards of the initial column is completed, moving the tray by the stepper module by a predetermined distance or moving the probe module using the moving arm by the predetermined distance to enable memory cards of the next column of the tray to be preloaded.

23. The non-transitory computer-readable medium as claimed in claim 22, further comprising:

when the preloading content for the memory cards of the initial column is completed, comparing the preloaded content of the memory cards with the digital content stored in the memory buffers using a probe module;

sending a test termination signal and comparison result to the sorting module; enabling the probes from the memory cards and determining whether the handler control module of the control unit has completed the preloading content process;

if the preloading content process is incomplete, moving the probe module or the tray by the predetermined distance; and sorting the memory cards using the sorting module, wherein failed memory cards are determined based on the comparison results, while the preloading content process using the probe module is being performed on the memory cards at the next column.

24. The non-transitory computer-readable medium as claimed in claim 23, further comprising:

if the preloading content is complete, moving the probe module or the tray by a predetermined distance; and sorting the memory cards using the sorting module, wherein failed memory cards are determined based on the comparison results.

25. The non-transitory computer-readable medium as claimed in claim 24, further comprising:

determining whether the handler control module has completed the sorting process; and if the sorting is complete, removing the tray from the tray module.

26. The non-transitory computer-readable medium as claimed in claim 25, further comprising:

determining whether the handler control module has completed the preloading content process; and if the preloading content process is incomplete, reloading the tray in the tray module or moving the probe module to the initial position, or loading another tray in the tray for another preloading content process.

27. The non-transitory computer-readable medium as claimed in claim 26, further comprising moving the probe module or the tray back to the center position or the initial position of the tray module and turning off the handler unit and the control unit if the preloading content process is incomplete.

28. An office automation device for preloading content on memory cards, comprising:
  a handler unit, further comprising:
  a first interface module;
  a probe module providing plural probes;
  a moving arm;
  a tray module; and
  a sorting module; and
  a control unit, further comprising:
  a digital content management module providing memory buffers that store digital content and parameters related to the digital content;
  a handler control module; and
  a second interface module, connecting the control unit to the handler unit via the first interface,
  wherein a tray carrying memory cards to be preloaded is loaded in the tray module,
  the handler control module of the control unit starts to perform a preloading content process comprising a preload check, preloading content based on the digital content stored in the buffers, and a preloaded content comparison, wherein the memory cards at the initial column of the tray are checked, preloaded, and compared with the preloaded digital content using the probes of the probe module, and
  when the preloading content for the memory cards at the initial column of the tray is completed, the probe module is then moved by the moving arm by a predetermined distance to enable the memory cards at the next column of the tray to be checked, preloaded, and compared with the preloaded digital content using the probes of the probe module while the sorting module is picking up or marks or records failed memory cards from the previous column based on records and instructions from the handler control module of the control units.

* * * * *